US008120680B2

(12) United States Patent
Kim et al.

(10) Patent No.: US 8,120,680 B2
(45) Date of Patent: Feb. 21, 2012

(54) IMAGE SENSOR

(75) Inventors: Jin Hak Kim, Seoul (KR); Hiromichi Tanaka, Suwon-si (KR); Yong In Han, Seongnam-si (KR); Eugene Fainstain, Ramat-Gab (IL)

(73) Assignee: Samsung Electronics Co., Ltd., Suwon-Si (KR)

( * ) Notice: Subject to any disclaimer, the term of this patent is extended or adjusted under 35 U.S.C. 154(b) by 369 days.

(21) Appl. No.: 12/369,247

(22) Filed: Feb. 11, 2009

(65) Prior Publication Data
US 2009/0213252 A1    Aug. 27, 2009

(30) Foreign Application Priority Data

Feb. 11, 2008   (KR) .................. 10-2008-0012127

(51) Int. Cl.
*H04N 9/083* (2006.01)
(52) U.S. Cl. ........................ 348/276; 348/277
(58) Field of Classification Search .......... 348/276–280
See application file for complete search history.

(56) References Cited

U.S. PATENT DOCUMENTS

| | | | | |
|---|---|---|---|---|
| 4,714,955 A * | 12/1987 | Nishimura et al. | ........... | 348/237 |
| 4,721,999 A | 1/1988 | Takemura et al. | | |
| 4,939,573 A * | 7/1990 | Teranishi et al. | ............. | 348/276 |
| 5,506,618 A * | 4/1996 | Yoneyama et al. | ........... | 348/234 |
| 5,614,947 A * | 3/1997 | Tanizoe et al. | ................ | 348/241 |
| 6,529,239 B1 * | 3/2003 | Dyck et al. | ..................... | 348/279 |
| 6,559,886 B1 * | 5/2003 | Miyahara | ................... | 348/226.1 |
| 6,628,718 B1 * | 9/2003 | Niwamoto | ............... | 375/240.23 |
| 6,967,748 B1 * | 11/2005 | Takarada | ....................... | 358/1.9 |
| 7,307,657 B2 * | 12/2007 | Miyahara | .................. | 348/228.1 |
| 7,313,372 B2 * | 12/2007 | Salcido et al. | ............. | 455/127.1 |
| 7,379,110 B2 * | 5/2008 | Ohtsuru | ....................... | 348/311 |
| 7,864,233 B2 * | 1/2011 | Kwon et al. | ................. | 348/272 |
| 2007/0285540 A1 * | 12/2007 | Kwon et al. | ................. | 348/272 |

FOREIGN PATENT DOCUMENTS

| | | |
|---|---|---|
| JP | 59-198754 | 11/1984 |
| JP | 04-020091 | 1/1992 |
| JP | 09-090118 | 4/1997 |

OTHER PUBLICATIONS

JP09-090118, Apr. 4, 1997 English Abstract.*

* cited by examiner

*Primary Examiner* — David Ometz
*Assistant Examiner* — Dillon Durnford Geszvain
(74) *Attorney, Agent, or Firm* — F. Chau & Associates, LLC

(57) ABSTRACT

An image sensor capable of canceling crosstalk without reduction of a signal to noise ratio (SNR) to improve a sensitivity includes a plurality of light detection units and a filter array including a plurality of filters, with each of the plurality of filters being deposited on a corresponding one of the light detection units. The filter array includes a green filter used to transmit a green component of an incident light, a yellow filter used to transmit a yellow component of the incident light, and a cyan filter used to transmit a cyan component of the incident light.

10 Claims, 19 Drawing Sheets

FIG. 1B

| 0.3 | 0.3 | 0.3 | 0.3 |
|-----|-----|-----|-----|
| 0.3 | 0.3 | 0.3 | 0.3 |
| 0.3 | 0.3 | 0.3 | 0.3 |
| 0.3 | 0.3 | 0.3 | 0.3 |

FIG. 2B

| 1.0 | 0.3 | 1.0 | 0.3 |
|-----|-----|-----|-----|
| 0.7 | 1.0 | 0.7 | 1.0 |
| 1.0 | 0.3 | 1.0 | 0.3 |
| 0.7 | 1.0 | 0.7 | 1.0 |

IMAGE SENSOR

CROSS-REFERENCE TO RELATED APPLICATIONS

This application claims priority under 35 U.S.C. §119 to Korean Patent Application No. 10-2008-0012127, filed on Feb. 11, 2008, the disclosure of which is hereby incorporated by reference herein in its entirety.

BACKGROUND

1. Technical Field

The present invention relates to an image sensor, and more particularly, to an image sensor capable of canceling crosstalk without reduction of a signal to noise ratio (SNR) so that sensitivity may be improved.

2. Description of the Related Art

As the performance of CMOS image sensors (CIS's) are being rapidly improved, CIS devices having beneficial characteristics such as a low power consumption, compact size, and low cost manufacture are being produced. These improved CIS's are replacing charge coupled device (CCD) image sensors. However, as the size of a pixel to capture an image decreases, the following difficulties may be encountered.

For example, as the size of a pixel decreases, the area of a photodiode may decrease as well. Accordingly, even if an on-chip microlens is used, since the amount of light incident on the pixel may decrease, the number of electrons generated by the photodiode may decrease so that a sensitivity may be reduced.

Also, as the size of a pixel decreases, to obtain the highest sensitivity, the distance between adjacent pixels may also need to be decreased. When the distance between the adjacent pixels decreases, the crosstalk between the adjacent pixels may increase. Consequently, as a result, the SNR may be decreased so that color reproduction may thereby be deteriorated.

Moreover, in a conventional RGB Bayer pattern, the transmissivity may be low because each of color filters of the RGB Bayer pattern may absorb incident light. Thus, the sensitivity of a signal may not be high due to a low transmissivity so that it may be difficult to prevent crosstalk.

SUMMARY

Exemplary embodiments of the present invention may provide an image sensor using a complementary color filter and a white filter which may increase the transmissivity of an incident light, improve an SNR of a luminance signal, and cancel crosstalk, thereby improving the sensitivity of an image sensor.

In accordance with an exemplary embodiment of the present invention, an image sensor is provided. The image sensor comprising a plurality of light detection units and a filter array including a plurality of filters, with each of the plurality of filters being deposited on a corresponding one of the light detection units. The filter array comprises a green filter used to transmit a green component of an incident light, a yellow filter used to transmit a yellow component of the incident light, and a cyan filter used to transmit a cyan component of the incident light.

The yellow filter and the cyan filter are located in the same row. The yellow filter and the green filter are arranged in a first diagonal direction and the cyan filter and the green filter are arranged in a second diagonal direction.

The light detection units comprise a first light detection unit converting light passing through the green filter to a first electric signal, a second light detection unit converting light passing through the yellow filter to a second electric signal, and a third light detection unit converting light passing through the cyan filter to a third electric signal.

The image sensor further comprises a first operation circuit calculating a red signal by subtracting the first electric signal from the second electric signal and a second operation circuit calculating a blue signal by subtracting the first electric signal from the third electric signal. The filter array further comprises a first white filter used to transmit the incident light and a second white filter used to transmit the incident light.

The first and second white filters are diagonally arranged, the first white filter and the green filter are arranged in the same row, and the yellow filter, the cyan filter, and the second white filter are arranged in the same row.

In accordance with an exemplary embodiment of the present invention, an image sensor is provided. The image sensor includes a plurality of light detection units, a filter array including a plurality of filters, with each of the plurality of filters being deposited on a corresponding one of the light detection units and an operation unit. The plurality of light detection units include a green detection unit having a green pixel, a yellow detection unit having a yellow pixel, a cyan detection unit having a cyan pixel, a first white detection unit having a first white pixel and a second white detection unit having a second white pixel. The filter array comprises a green filter used to transmit a green component of an incident light, a yellow filter used to transmit a yellow component of the incident light, a cyan filter used to transmit a cyan component of the incident light, a first white filter used to transmit the incident light and a second white filter used to transmit the incident light. Moreover, the operation unit comprises a red signal operation unit which generates a red signal where cross-talk is canceled, a blue signal operation unit which generates a blue signal where cross-talk is canceled and a green signal operation unit which outputs a green signal from an electrical signal output from the green pixel.

BRIEF DESCRIPTION OF THE DRAWINGS

Exemplary embodiments of the present invention can be understood in more detail from the following description taken in conjunction with the accompanying drawings in which:

FIGS. 1A and 1B, respectively, illustrate a common Bayer pattern and an average sensitivity;

FIGS. 2A and 2B, respectively, illustrate a color filter array according to an exemplary embodiment of the present invention and a sensitivity of the color filter array;

DETAILED DESCRIPTION OF THE EXEMPLARY EMBODIMENTS OF THE INVENTION

Figure 1A:
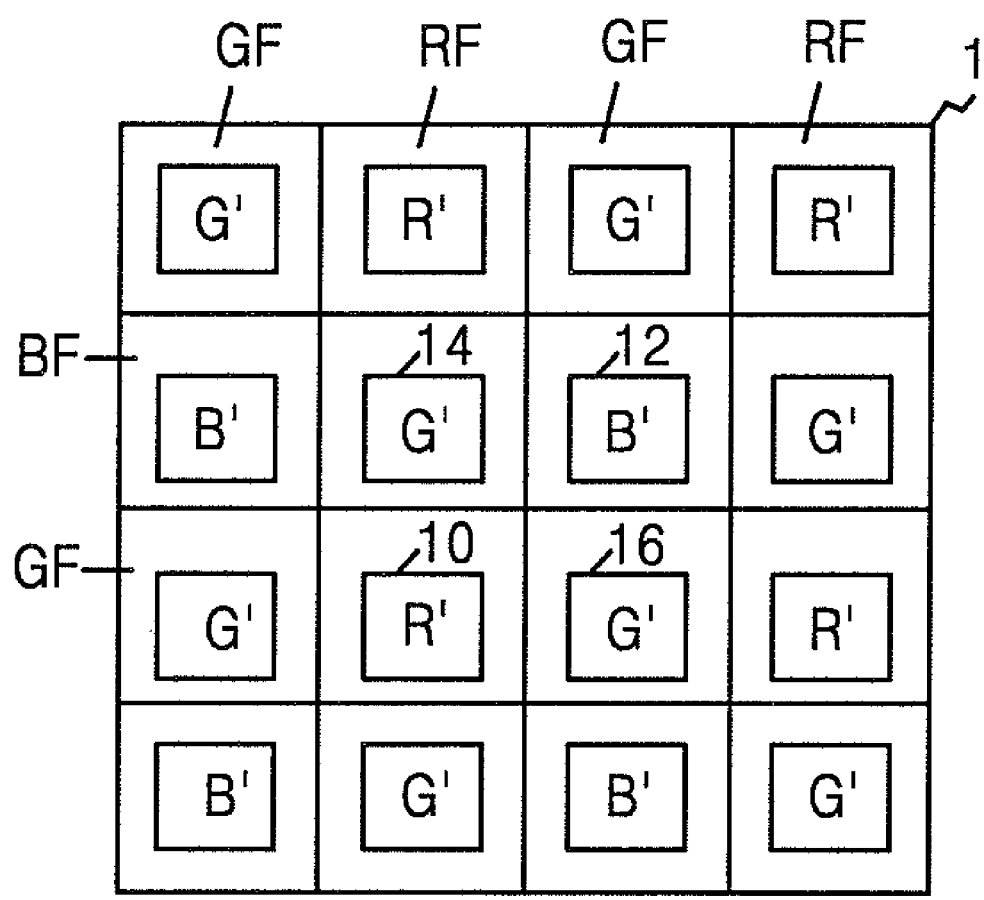

Hereinafter, the present invention will be described in detail by explaining exemplary embodiments of the present invention with reference to the attached drawings. Like reference numerals in the drawings denote like elements.

Figure 1B:
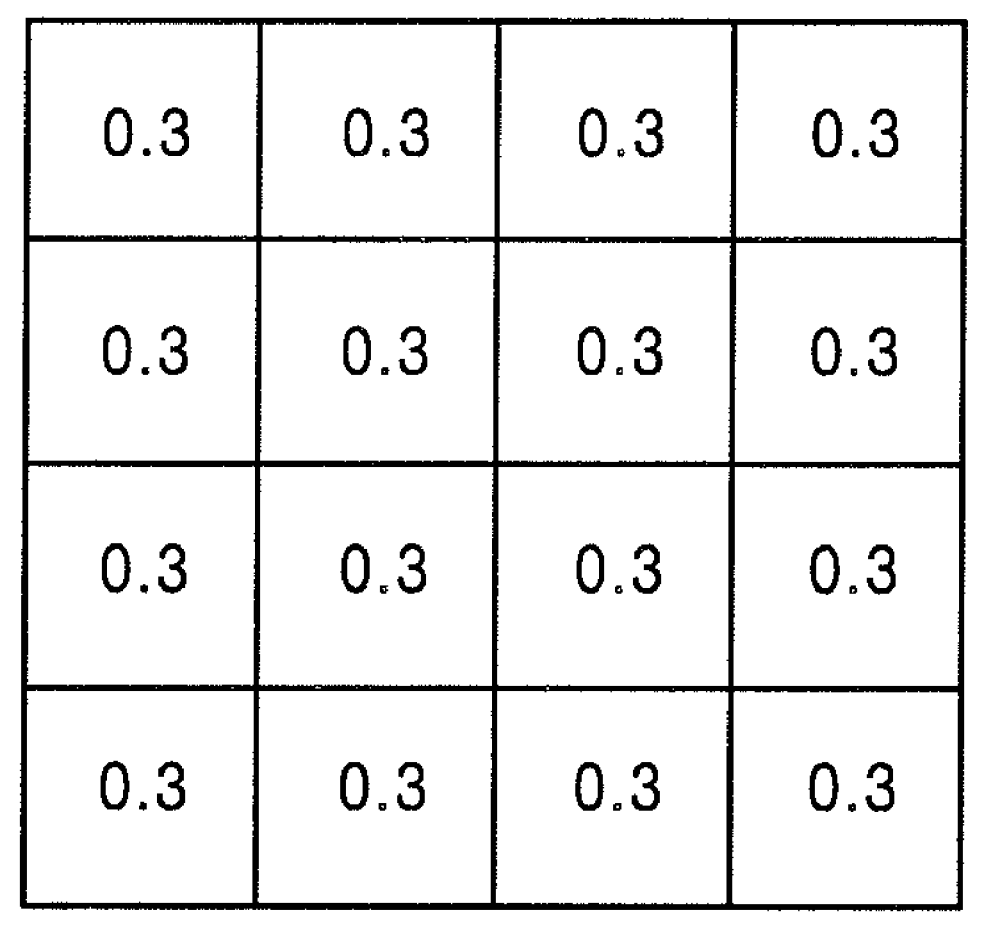

FIGS. 1A and 1B, respectively, illustrate a common Bayer pattern 1 and an average sensitivity. FIG. 1A illustrates the common Bayer pattern 1 in which RF, GF, and BF, respectively, denote a red filter, a green filter, and a blue filter. Also, R' denotes a red detection unit capable of detecting light passing through the RF, G' denotes a red detection unit capable of detecting light passing through the GF, and B' denotes a red detection unit capable of detecting light passing through the BF.

Referring to FIG. 1B, an average sensitivity of the light detection units R', G', and B' may be, for example, about 0.3. For example, a red detection unit 10 may be affected by crosstalk generated by the light passing through each of four GFs located at the upper, lower, left, and right sides of the red detection unit 10 and a blue detection unit 12 may be affected by crosstalk generated by the light passing through each of four GFs located at the upper, lower, left, and right sides of the blue detection unit 12.

Also, a green detection unit 14 may be affected by crosstalk generated by the light passing through each of two RFs located at the upper and lower sides of the green detection unit 14 and crosstalk generated by the light passing through each of two BFs located at the left and right sides of the green detection unit 14. Another green detection unit 16 may be affected by crosstalk generated by the light passing through each of two BFs located at the upper and lower sides of the green detection unit 16 and crosstalk generated by the light passing through each of two RFs located at the left and right sides of the green detection unit 16. Thus, the crosstalk may not be canceled at all in an interpolation process that is performed in an image sensor including the Bayer pattern 1.

Figure 2A:
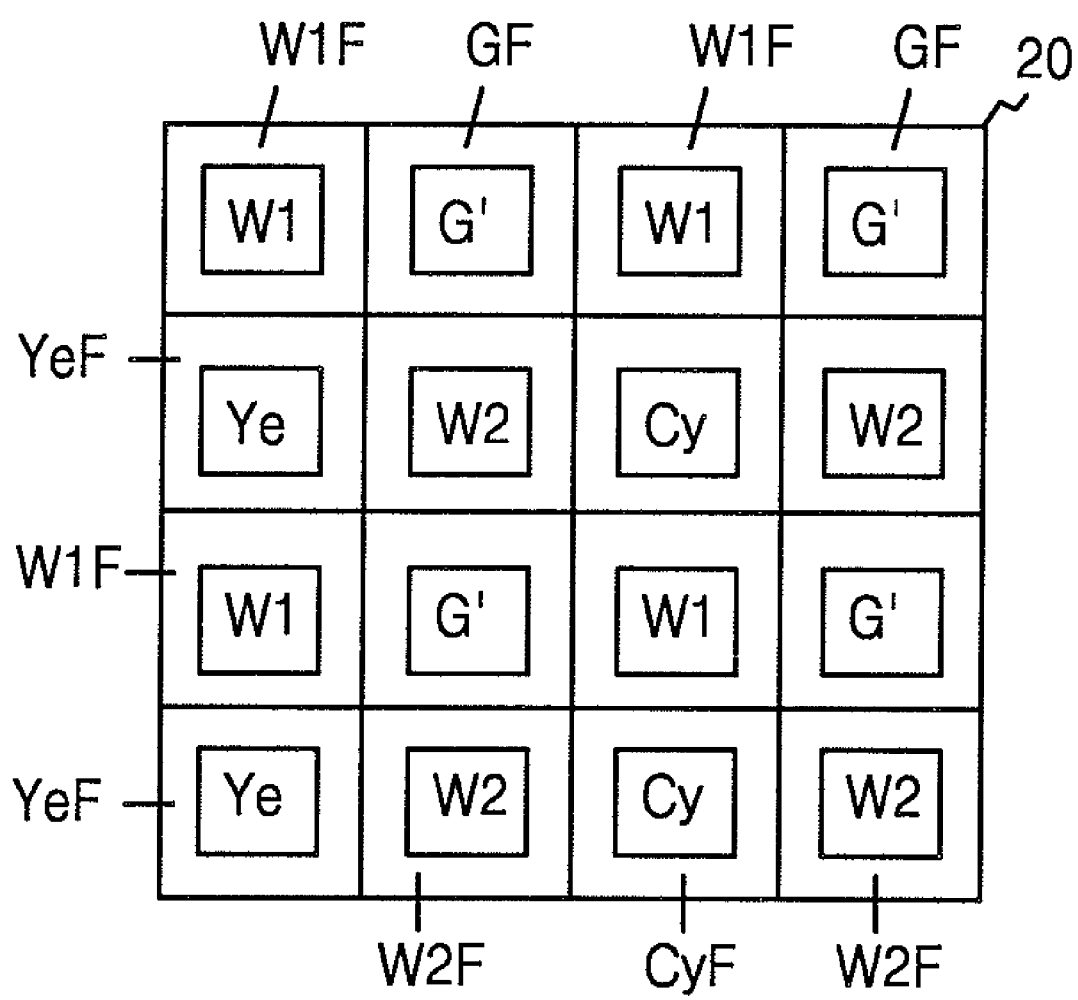

FIGS. 2A and 2B, respectively, illustrate a color filter array 20 according to an exemplary embodiment of the present invention and a sensitivity of the color filter array. Referring to FIGS. 2A and 2B, the color filter array 20 includes a plurality of W1Fs, a plurality of W2Fs, a plurality of GFs, a plurality of YeFs, and a plurality of CyFs. The color filter array 20 has a plurality of m×m patterns, where m and n are natural numbers, for example, m=n or m≠n.

For example, the 4×4 pattern includes W1Fs, W2Fs, GFs, YeFs, and CyFs, as shown in FIG. 2A. W1F, W2F, GF, YeF, and CyF, respectively, denote a first white filter, a second white filter, a green filter, a yellow filter, and a cyan filter. The 4×4 pattern of FIG. 2A includes four W1Fs, four W2Fs, four GFs, two YeFs, and two CyFs. The luminance transmission characteristic of the W1F and the luminance transmission characteristic of the W2F may be embodied to be the same or different from each other according to exemplary embodiments. W1F and W2F are alternatively arranged in units of rows. W1F and W2F are arranged diagonally, W1F and GF are arranged in the same row, and W2F, YeF, and CyF are arranged in the same row.

Also, W1 denotes a first light detection unit or a first white pixel detecting the light passing through W1F. G' denotes a second light detection unit or a green pixel detecting the light passing through GF. Ye denotes a third light detection unit or a yellow pixel detecting the light passing through YeF. Cy denotes a fourth light detection unit or a cyan pixel detecting the light passing through CyF. W2 denotes a fifth light detection unit or a second white pixel detecting the light passing through W2F.

Each of the first through fifth light detection units W1, G', Ye, Cy, and W2 may convert an optical signal to an electric signal. For example, each of the first through fifth light detection units W1, G', Ye, Cy, and W2 may be embodied by a photodiode formed in a semiconductor substrate.

As shown in FIG. 2B, the sensitivity of each of the first and second white pixels W1 and W2 may be, for example, about 1.0, the sensitivity of each of the yellow pixel Ye and the cyan pixel Cy may be, for example, about 0.7, and the sensitivity of the green pixel G' may be, for example, 0.3. Each of the YeF and CyF may be a complementary filter. In general, the light transmissivity of a complementary filter like YeF and CyF is higher than that of each of primary color filters RF, GF, and BF shown in FIG. 1A. When the color filter array 20 as shown in FIG. 2A is used, the average sensitivity of the light detection units formed under the color filter array 20 may be, for example, about 0.75 which is quite higher than that, for example, about 0.3, of the light detection units formed under the Bayer pattern 1 of FIG. 1A.

Figure 3:
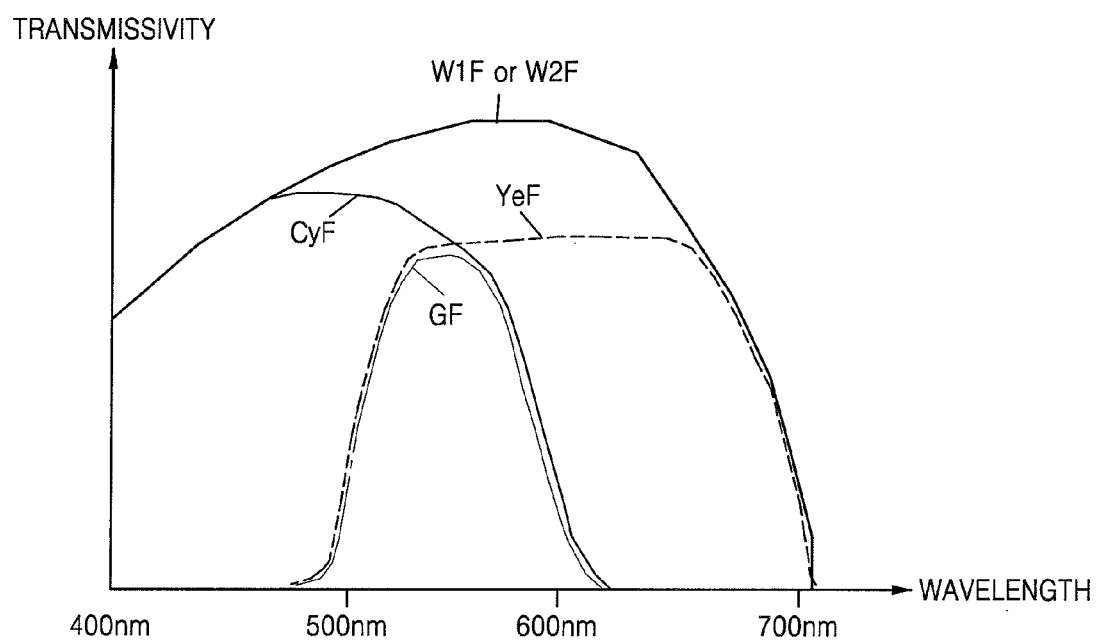
FIG. 3 is a graph showing light transmissivity of a white filter, a green filter, a yellow filter, and a cyan filter of the color filter array according to an exemplary embodiment of the present invention.
Figure 4A:
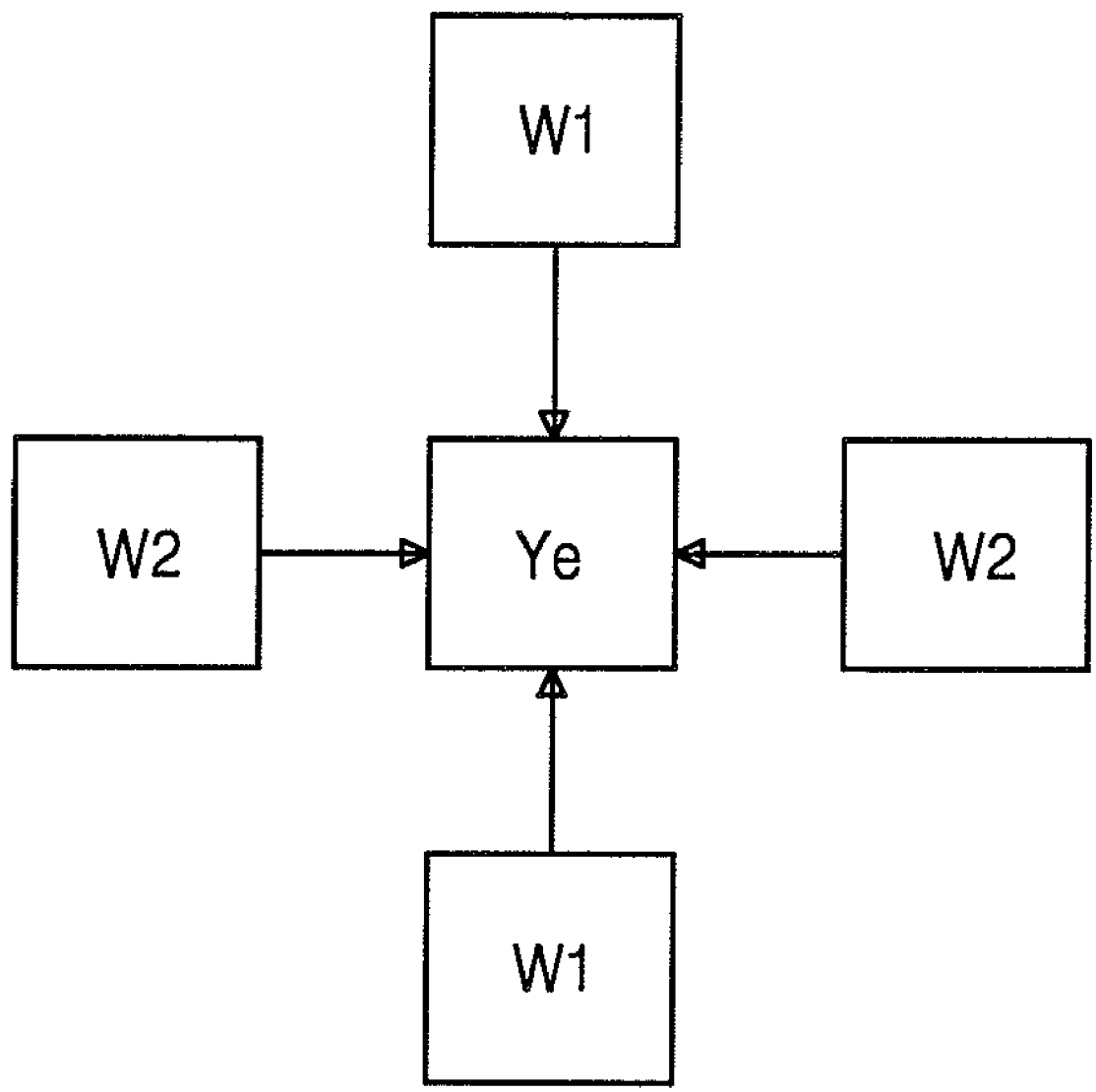
FIGS. 4A and 4B, respectively, are a block diagram illustrating a yellow pixel and a graph for explaining crosstalk affecting the yellow pixel.
Figure 4B:
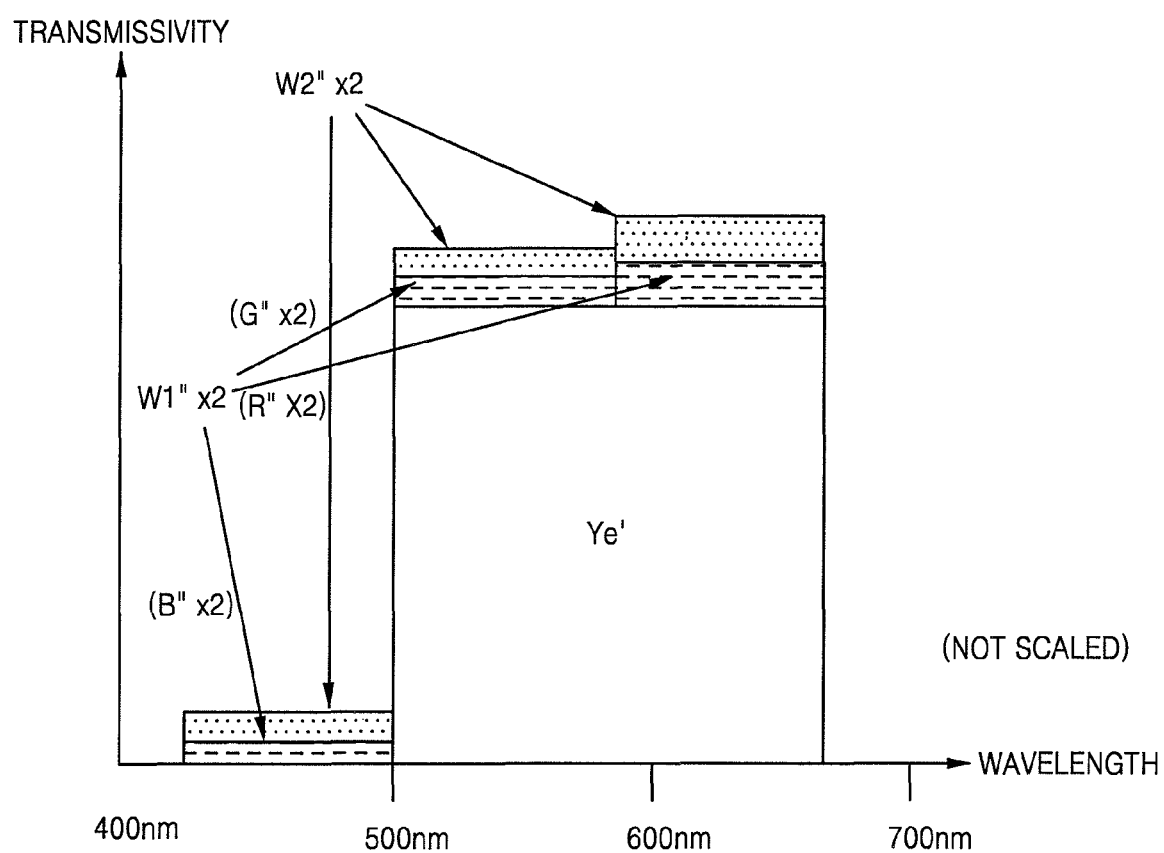

FIG. 3 is a graph showing the light transmissivity or relative light transmissivity of the white filter W1F or W2F, the green filter GF, the yellow filter YeF, and the cyan filter CyF of the color filter array according to an exemplary embodiment of the present inventive concept. FIGS. 4A and 4B, respectively, are a block diagram illustrating a yellow pixel and a graph for explaining crosstalk affecting the yellow pixel. Referring to FIGS. 2A and 4A, the first white pixels W1 are arranged at the upper and lower sides of the yellow pixel Ye and the second white pixels W2 are arranged at the left and right sides of the yellow pixel Ye.

As shown in FIGS. 4A and 4B, the yellow pixel Ye may be affected by crosstalk due to the light passing through each of the four white filters W1F and W2F. In FIG. 4B, "×2" signifies two times. That is, the yellow pixel Ye may be affected not only by light Ye' having a yellow component and passing through YeF, that is, light synthesized of light having a red component and light having a green component, but may also be affected by crosstalk W1" due to light having a white component and passing through each of the two W1Fs, that is, crosstalk R" due to light having a red component, crosstalk G" due to light having a green component, and crosstalk B" due to light having a blue component. Simultaneously, the yellow pixel Ye may be affected by crosstalk W2" due to light having a white component and passing through each of the two W2Fs, that is, the crosstalk R" due to light having a red component, the crosstalk G" due to light having a green component, and the crosstalk B" due to light having a blue component.

Theoretically, the yellow pixel Ye may be affected by a total crosstalk of 4×(R"+G"+B") due to the light passing through each of the white filters W1F and W2F arranged in the four directions. For convenience of explanation, it is assumed that the crosstalks W1" and W2" are the same but the exemplary embodiments of the present invention are not limited thereto.

Figure 5A:
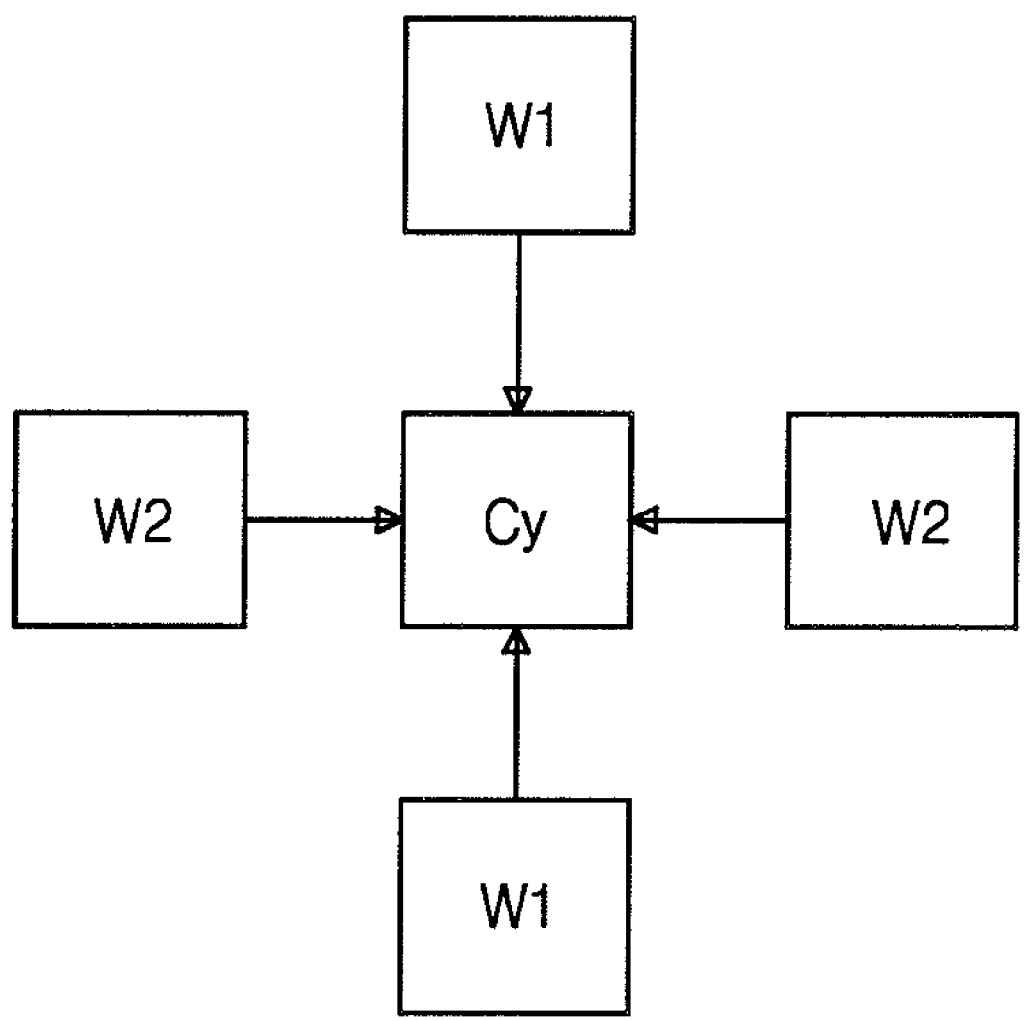
FIGS. 5A and 5B, respectively, are a block diagram illustrating a cyan pixel and a graph for explaining crosstalk affecting the cyan pixel.
Figure 5B:
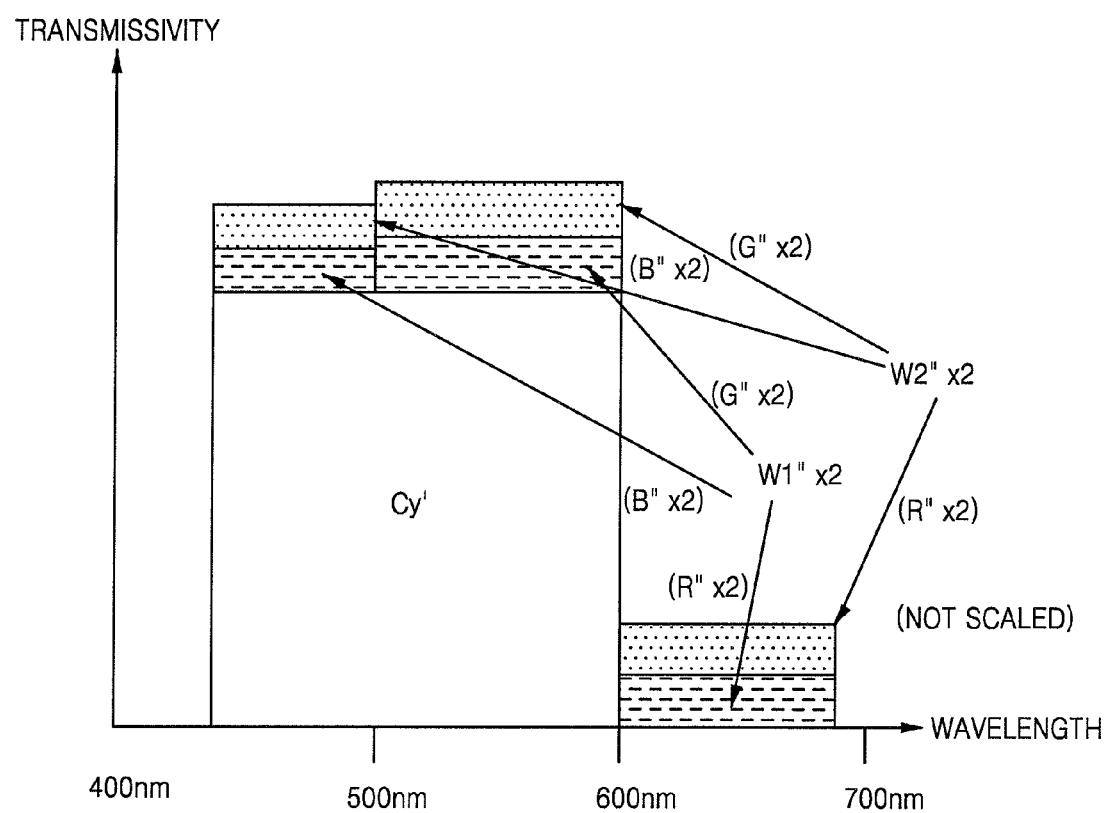

FIGS. 5A and 5B, respectively, are a block diagram illustrating a cyan pixel and a graph for explaining crosstalk affecting the cyan pixel. Referring to FIGS. 2A and 5A, the first white pixels W1 are arranged at the upper and lower sides of the cyan pixel Cy and the second white pixels W2 are arranged at the left and right sides of the cyan pixel Cy.

As shown in FIGS. 5A and 5B, the cyan pixel Cy may be affected by crosstalk due to the light passing through each of the four white filters W1F and W2F. In FIG. 5B, "×2" signifies two times. That is, the cyan pixel Cy may be affected not only by light Cy' having a cyan component and passing through CyF, that is, light synthesized of light having a green component and light having a blue component, but may also be affect by crosstalk W1" due to light having a white component and passing through each of the two W1Fs, that is, crosstalk R" due to light having a red component, crosstalk G" due to light having a green component, and crosstalk B" due to light having a blue component. Simultaneously, the cyan pixel Cy may be affected by crosstalk W2" due to light having a white component and passing through each of the two W2Fs, that is, the crosstalk R" due to light having a red component, the crosstalk G" due to light having a green component, and the crosstalk B" due to light having a blue component.

Theoretically, the cyan pixel Cy may be affected by a total crosstalk of 4×(R"+G"+B") due to the light passing through each of the white filters W1F and W2F arranged in the four directions. For convenience of explanation, it is assumed that the crosstalks W1" and W2" are the same but the exemplary embodiments of the present invention are not limited thereto.

Figure 6A:
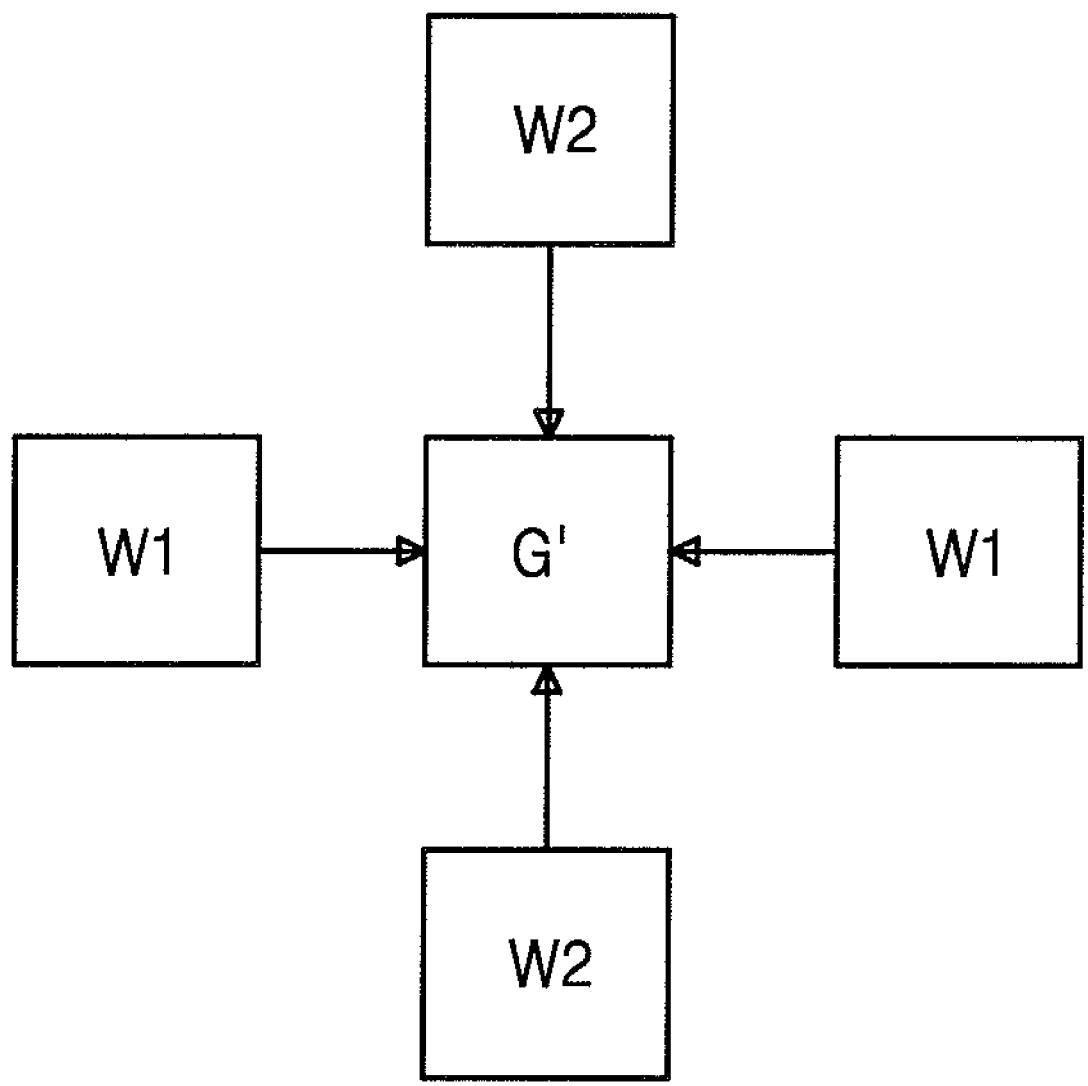
FIGS. 6A and 6B, respectively, are a block diagram illustrating a green pixel and a graph for explaining crosstalk affecting the green pixel.
Figure 6B:
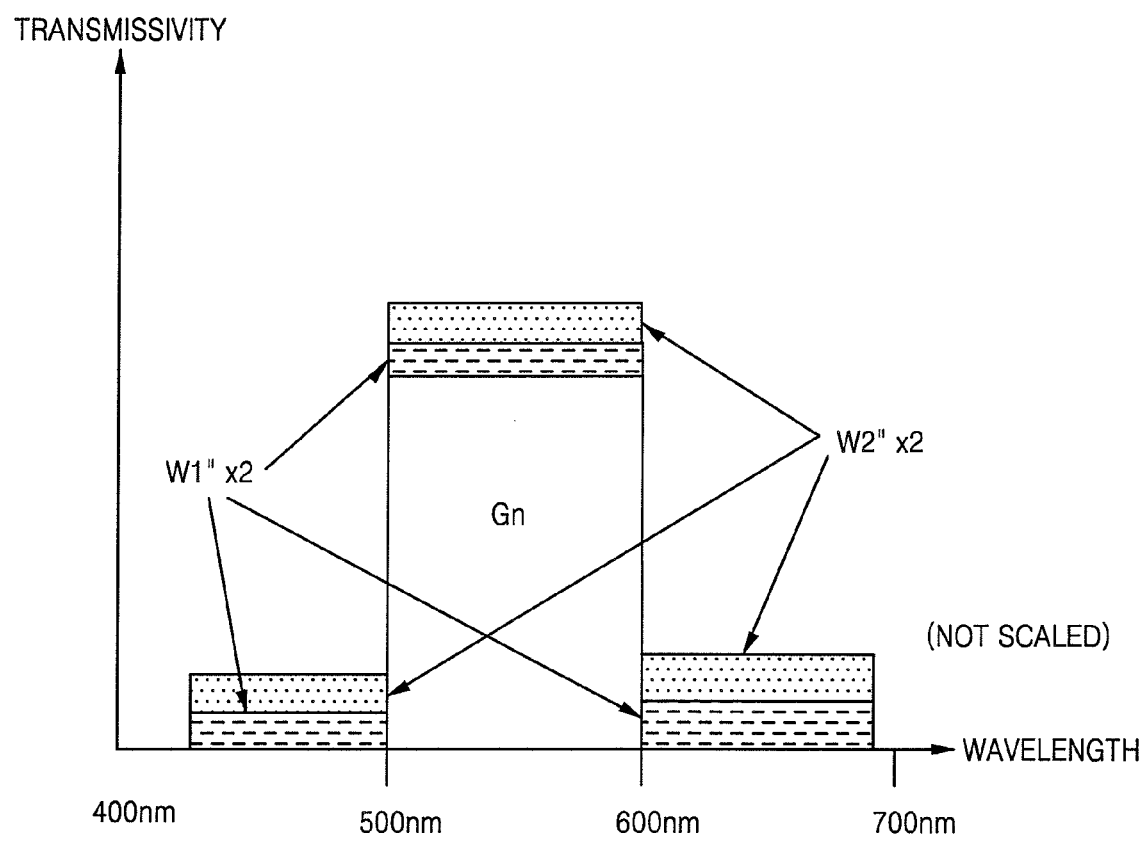

FIGS. 6A and 6B, respectively, are a block diagram illustrating a green pixel and a graph for explaining crosstalk affecting the green pixel. Referring to FIGS. 2A and 6A, the first white pixels W1 are arranged at the left and right sides of the green pixel G' and the second white pixels W2 are arranged at the upper and lower sides of the green pixel G'.

As shown in FIGS. 6A and 6B, the green pixel G' may be affected by crosstalk due to the light passing through each of the four white filters W1F and W2F. In FIG. 6B, "×2" signifies two times. That is, the green pixel G' may be affected not only by light having a green component and passing through GF, but also may be affected by crosstalk W1" due to light having a white component and passing through each of the two W1Fs, that is, crosstalk R" due to light having a red component, crosstalk G" due to light having a green component, and crosstalk B" due to light having a blue component. Simultaneously, the green pixel G' may be affected by crosstalk W2" due to light having a white component and passing through each of the two W2Fs, that is, the crosstalk R" due to light having a red component, the crosstalk G" due to light having a green component, and the crosstalk B" due to light having a blue component.

Theoretically, the green pixel G' may be affected by a total crosstalk of 4×(R"+G"+B") due to the light passing through each of the white filters W1F and W2F arranged in the four directions. For convenience of explanation, it is assumed that the crosstalks W1" and W2" are the same but the exemplary embodiments of the present invention are not limited thereto.

Figure 7A:
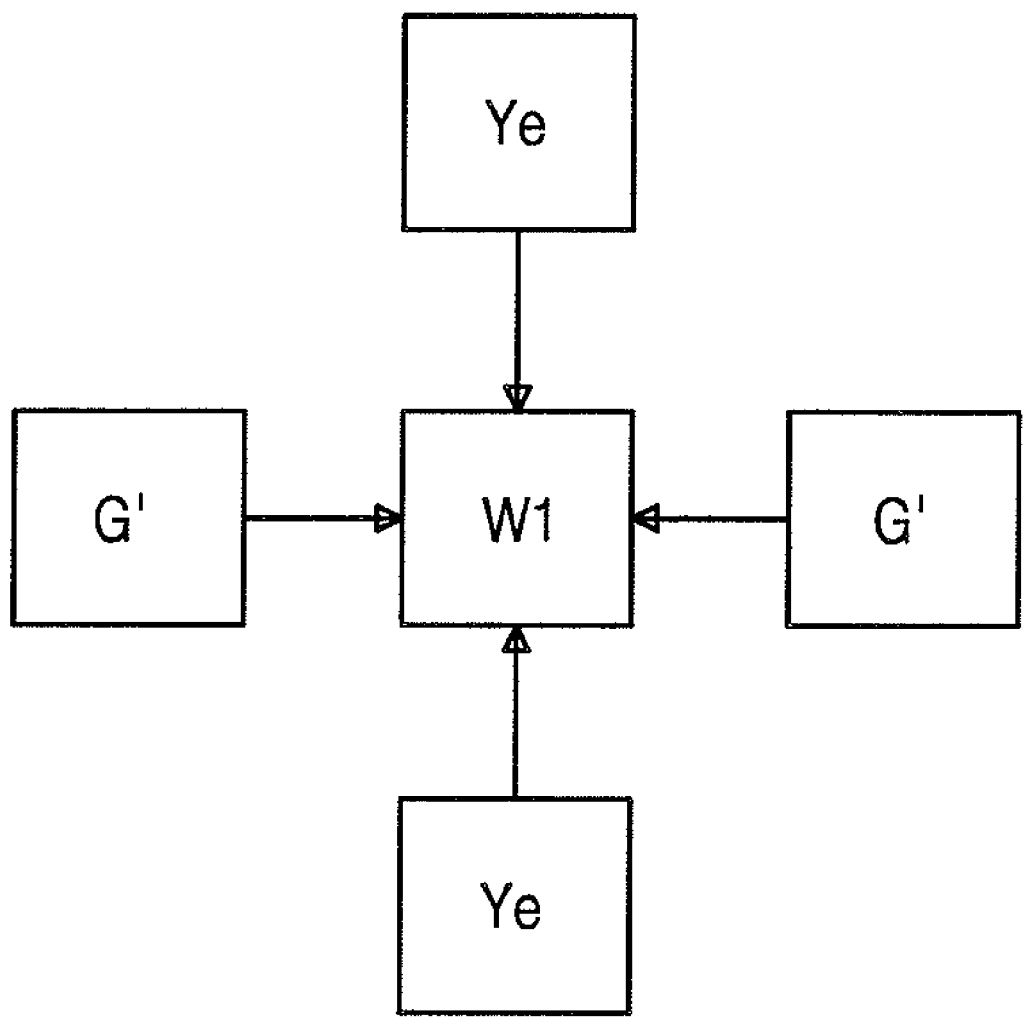
FIGS. 7A and 7B, respectively, are a block diagram illustrating a first white pixel and a graph for explaining crosstalk affecting the first white pixel.
Figure 7B:
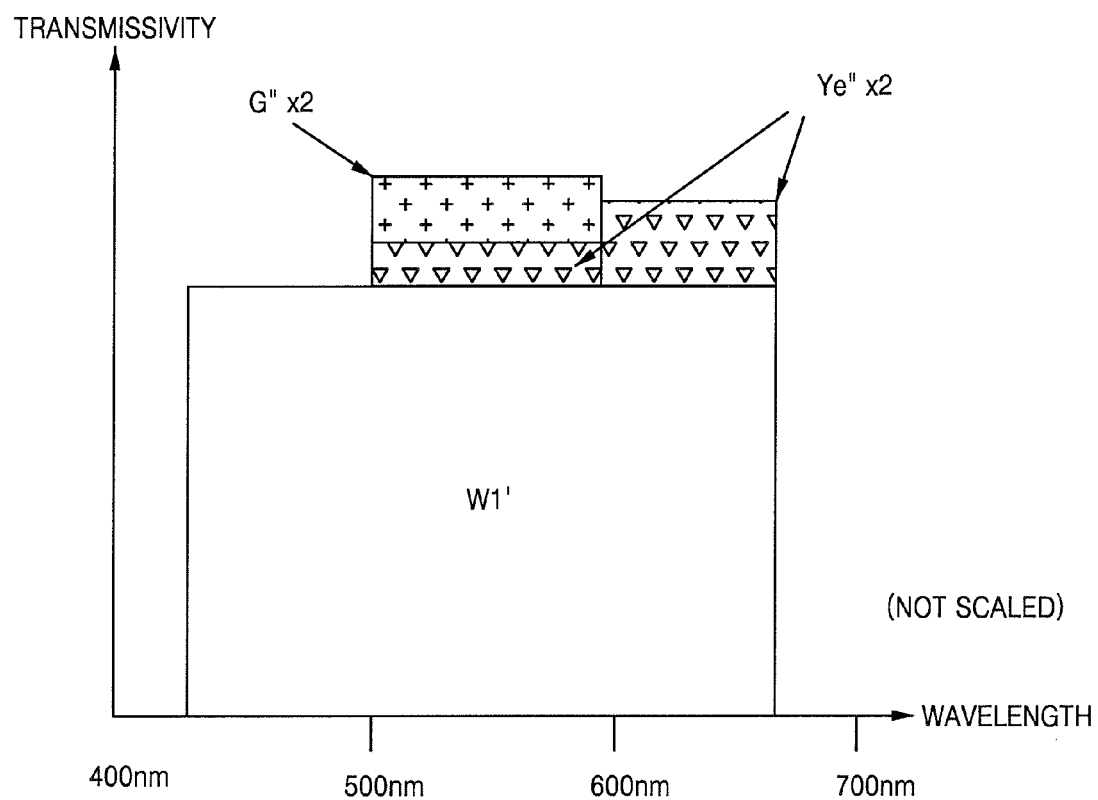

FIGS. 7A and 7B, respectively, are a block diagram illustrating a first white pixel and a graph for explaining crosstalk affecting the first white pixel. Referring to FIGS. 2A and 7A, the yellow pixels Ye are arranged at the upper and lower sides of the first white pixel W1 and the green pixels G' are arranged at the left and right sides of the first white pixel W1.

As shown in FIGS. 7A and 7B, the first white pixel W1 may be affected by crosstalk due to the light passing through each of the four filters YeF and CyF. In FIG. 7B, "×2" signifies two times. That is, the first white pixel W1 may be affected not only by light W1' having a white component and passing through W1F, that is, light synthesized of light having a red component, light having a green component, and light having a blue component, but may also be affected by crosstalk G" due to light having a green component and passing through each of the two GFs. Simultaneously, the first white pixel W1 may be affected by crosstalk Ye" due to light having a yellow component and passing through each of the two YeFs, that is, including the crosstalk R" due to light having a red component and the crosstalk G" due to light having a green component.

Theoretically, the first white pixel W1 may be affected by a total crosstalk of (2R"+4G") due to the light passing through each of the filters GF and YeF arranged in the four directions. Also, as shown in FIG. 2A, the cyan pixels Cy are arranged at the upper and lower sides of the first white pixel W1 and the green pixels G' are arranged at the left and right sides of the first white pixel W1. Accordingly, the first white pixel W1 may be affected by a total crosstalk of (2R"+4G") due to the light passing through each of the filters GF and CyF arranged in the four directions.

Figure 8A:
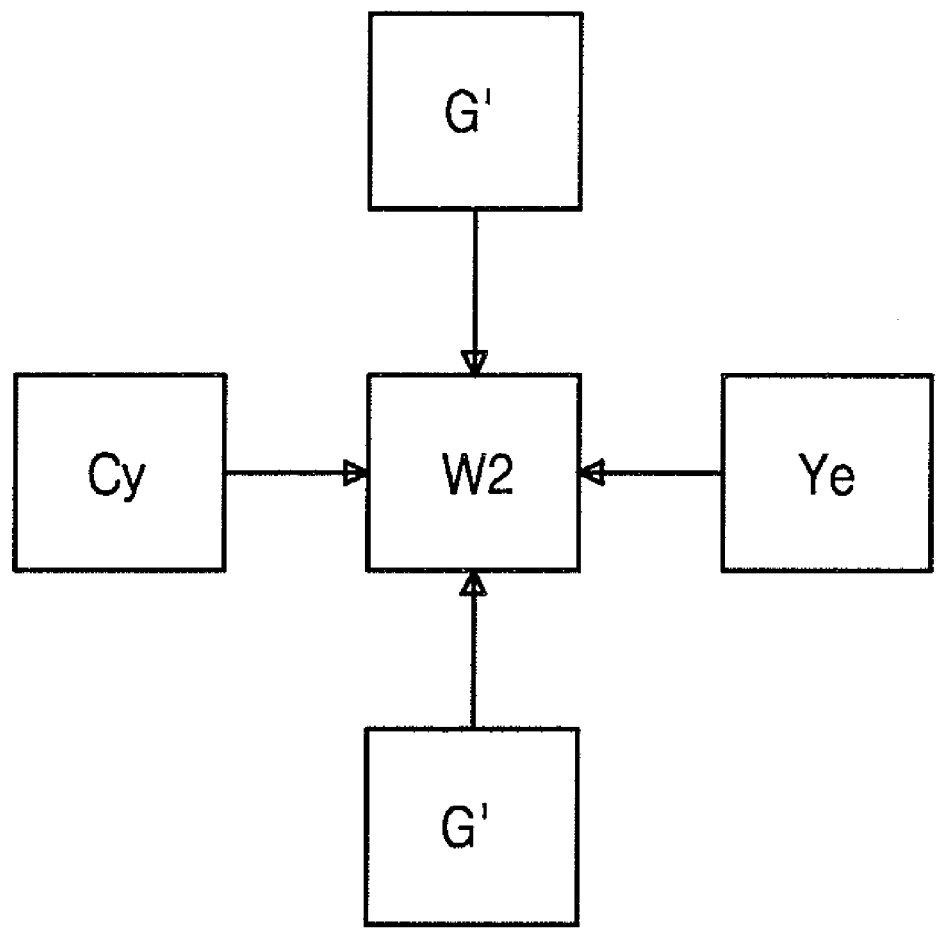
FIGS. 8A and 8B, respectively, are a block diagram illustrating a second white pixel and a graph for explaining crosstalk affecting the second white pixel.
Figure 8B:
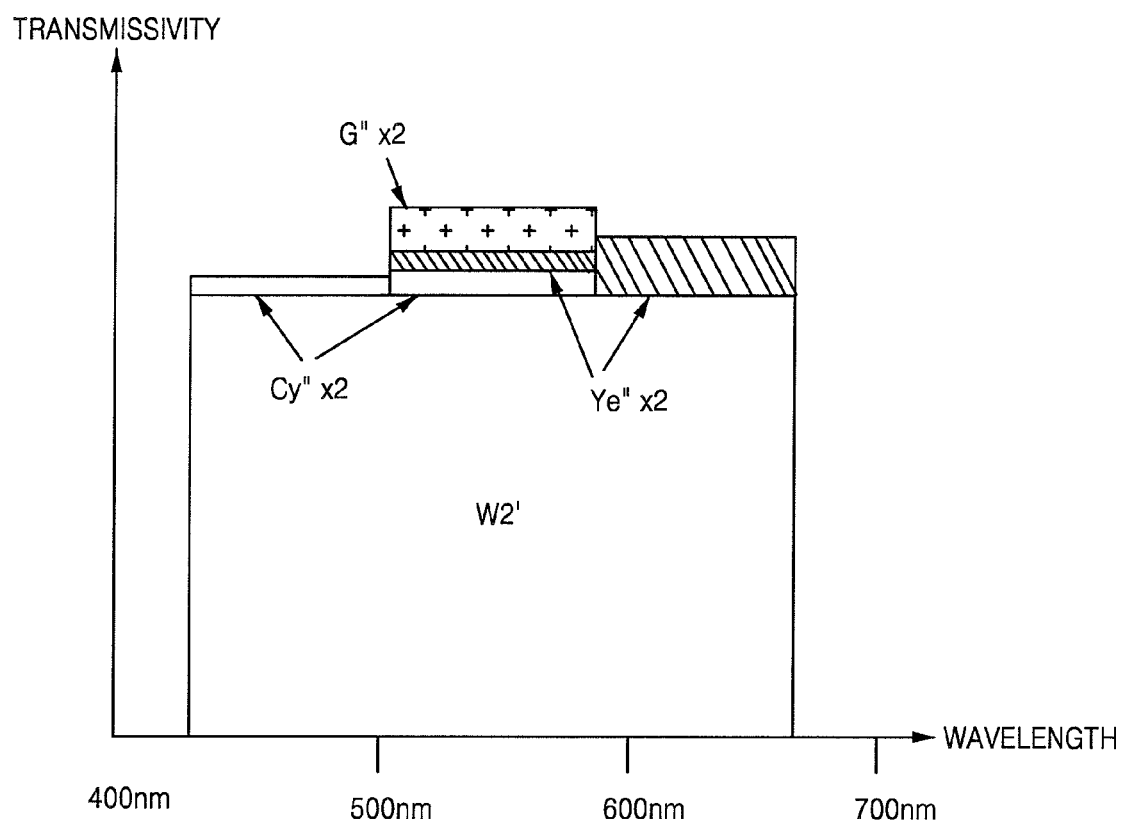

FIGS. 8A and 8B, respectively, are a block diagram illustrating a second white pixel and a graph for explaining crosstalk affecting the second white pixel. Referring to FIGS. 2A and 8A, the green pixels G' are arranged at the upper and lower sides of the second white pixel W2 and the cyan pixel Cy and the yellow pixel Ye are respectively arranged at the left and right sides of the second white pixel W2.

As shown in FIGS. 8A and 8B, the second white pixel W2 may be affected by crosstalk due to the light passing through each of the four filters GF, CyF, and YeF. In FIG. 8B, "×2" signifies two times. That is, the second white pixel W2 may be affected not only by light W2' having a white component and passing through W2F, that is, light synthesized of light having a red component, light having a green component, and light having a blue component, but may also be affected by crosstalk G" due to light having a green component and passing through each of the two GFs, crosstalk Cy" due to light having a cyan component and passing through the CyF, that is, including the crosstalk G" due to light having a green component and the crosstalk B" due to light having a blue component, and crosstalk Ye" due to light having a yellow component and passing through the YeF, that is, including the crosstalk R" due to light having a red component and the crosstalk G" due to light having a green component. Theoretically, the second white pixel W2 may be affected by a total crosstalk of (R"+4G"+B") due to the light passing through each of the filters GF, CyF, and YeF arranged in the four directions.

Figure 9:
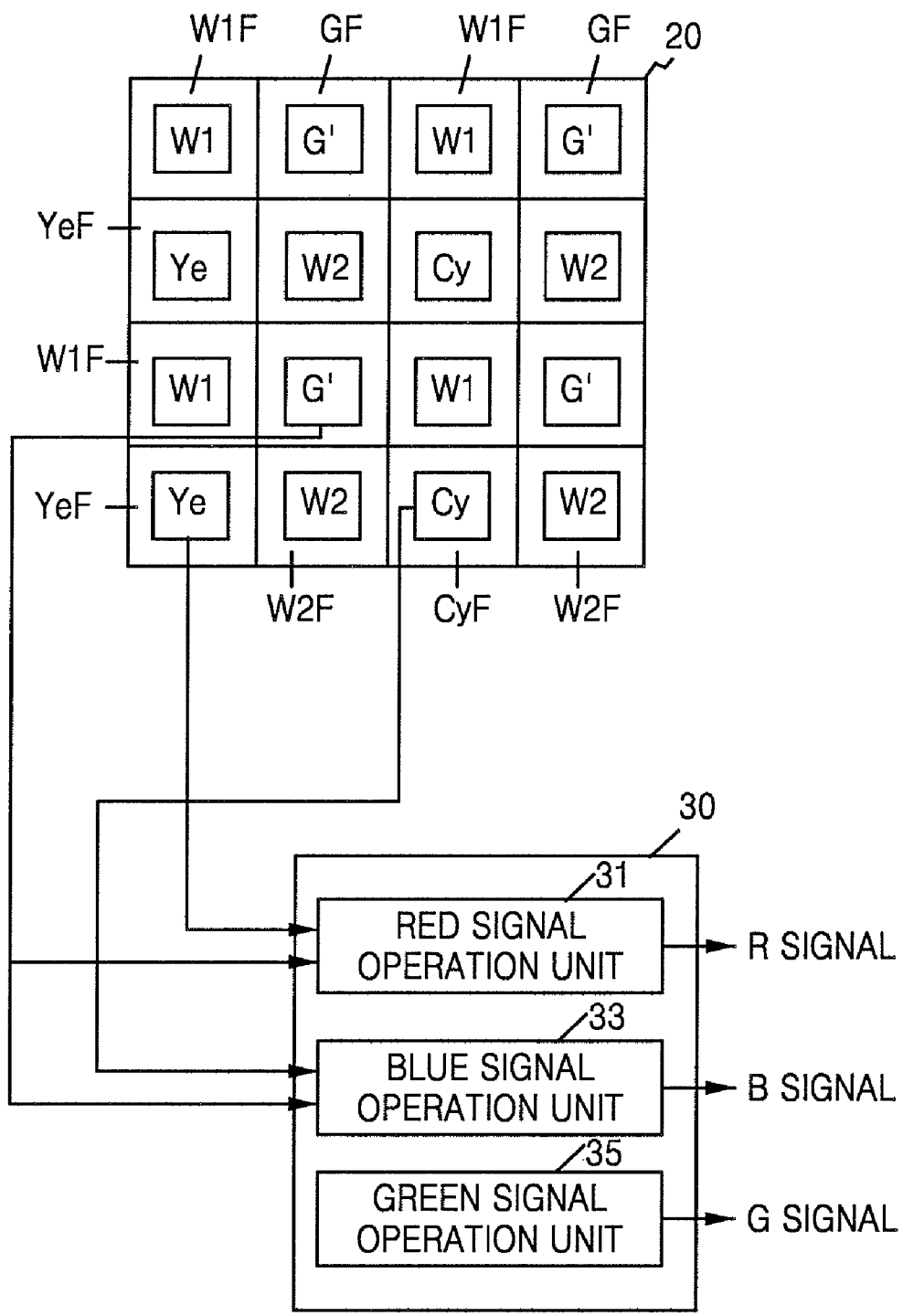
FIG. 9 is a block diagram schematically illustrating an image sensor according to an exemplary embodiment of the present inventive concept.

FIG. 9 is a block diagram schematically illustrating an image sensor 100 according to an exemplary embodiment of the present inventive concept. Referring to FIG. 9, the image sensor 100 used as an image pickup device includes the color filter array 20, a plurality of light detection units, and an operation (or calculation) unit 30.

The color filter array 20 has the structure and function described with reference to FIGS. 2A and 2B. That is, the color filter array 20 includes a plurality of filters W1F, GF, YeF, CyF, and W2F used to transmit a particular color component or spectrum range of an incident light. Each of the light detection units W1, G', Ye, Cy, and W2 detects light passing through a corresponding one of the filters W1F, GF, YeF, CyF, and W2F and generates an electric signal as a result of the detection.

The operation unit 30 includes a red signal operation unit 31, a blue signal operation unit 33, and a green signal operation unit 35. The red signal operation unit 31 subtracts an electric signal output from the green pixel G' from an electric signal output from the yellow pixel Ye to generate a red signal where crosstalk is canceled. The blue signal operation unit 33 subtracts the electric signal output from the green pixel G' from an electric signal output from the cyan pixel Cy to generate a blue signal where crosstalk is canceled. The green signal operation unit 35 outputs a green signal from the electric signal output from the green pixel G'. The crosstalk affecting the green pixel G' may be hardly canceled.

Figure 10:
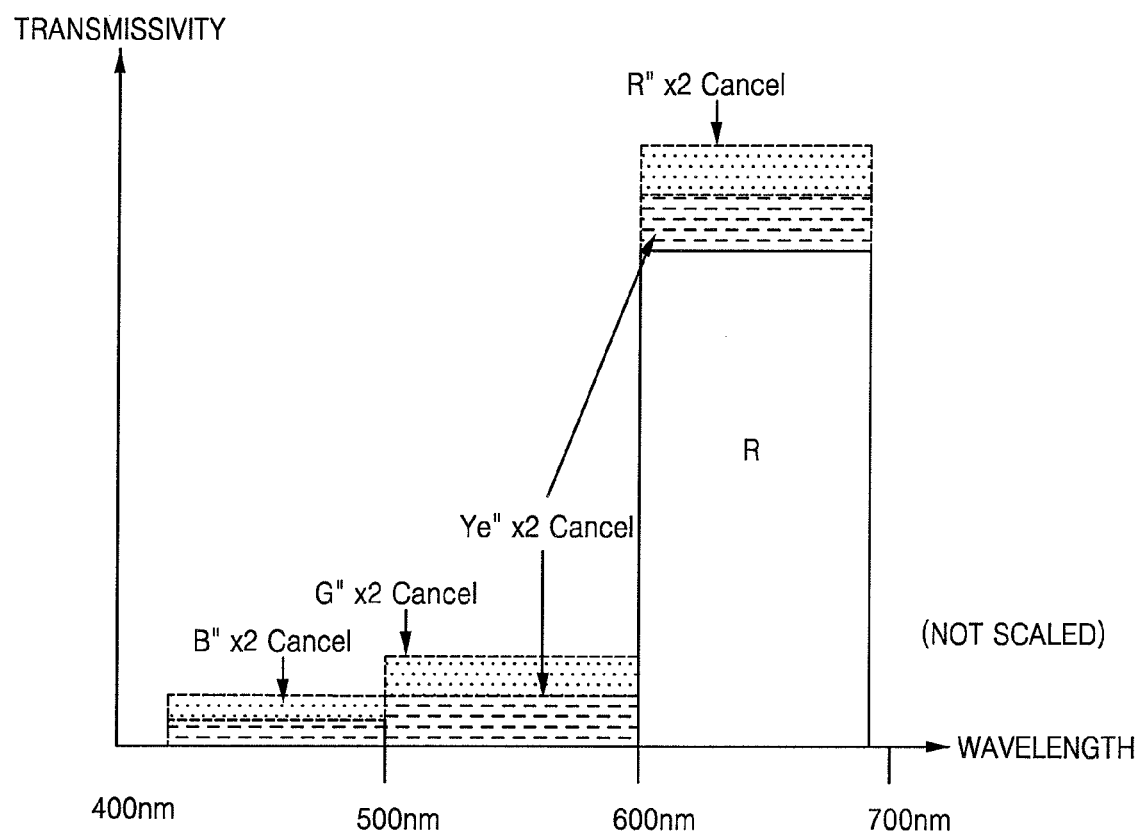
FIG. 10 is a graph for explaining the operation of a red signal operation unit of FIG. 9.

FIG. 10 is a graph for explaining the operation of the red signal operation unit 31 of FIG. 9. For convenience of explanation, a process of canceling crosstalk based on transmissivity according to a wavelength is illustrated. For example, only light having a red component where crosstalk is canceled remains by subtracting a transmissivity graph according to the wavelength of FIG. 6B from a transmissivity graph according to the wavelength of FIG. 4B. However, the red signal operation unit 31 outputs a red signal where, theoretically, crosstalk is completely canceled, as a result of subtracting the electric signal output from the green pixel G', that is, the light detection unit capable of detecting a wavelength in the green spectrum range passing through GF, from the electric signal output from the yellow pixel Ye, that is, the light detection unit capable of detecting a wavelength in the yellow spectrum range passing through YeF.

Figure 11:
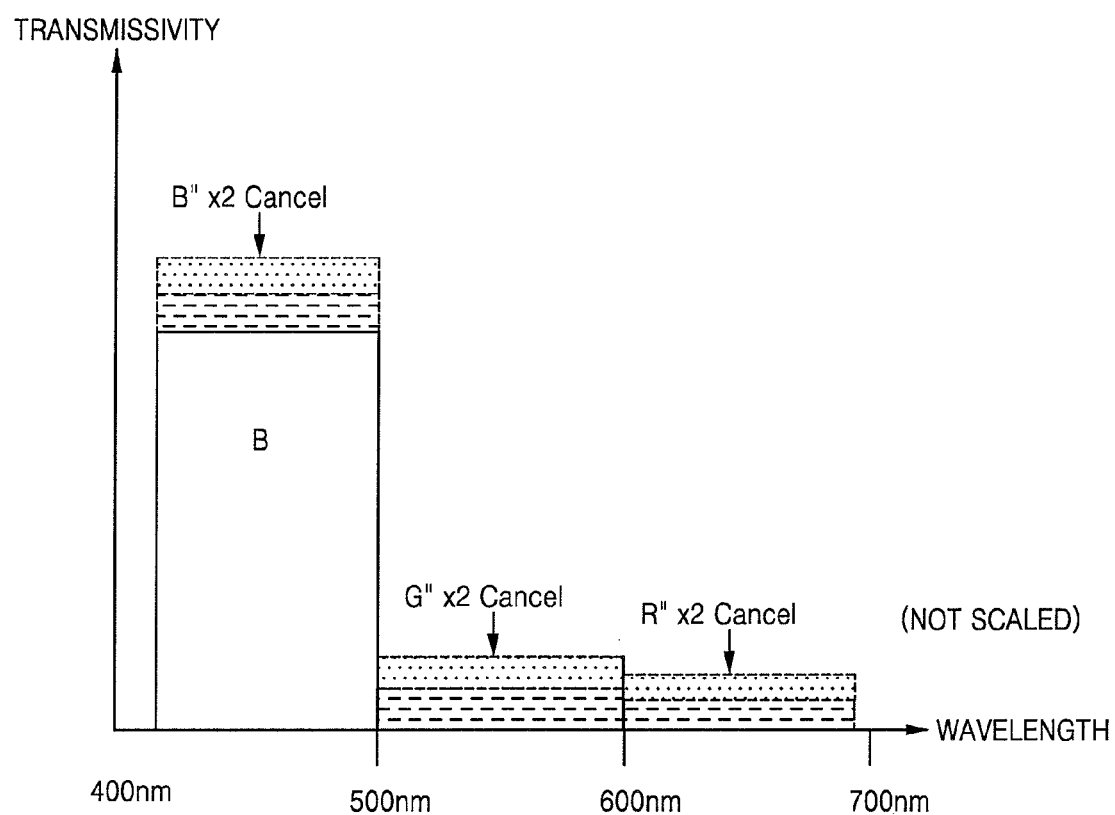
FIG. 11 is a graph for explaining the operation of a blue signal operation unit of FIG. 9.

FIG. 11 is a graph for explaining the operation of the blue signal operation unit 33 of FIG. 9. For convenience of explanation, a process of canceling crosstalk based on transmissivity according to a wavelength is illustrated. For example, only light having a blue component where crosstalk is canceled remains by subtracting a transmissivity graph according to the wavelength of FIG. 6B from a transmissivity graph according to the wavelength of FIG. 5B. However, the blue signal operation unit 33 outputs a blue signal where, theoretically, crosstalk is completely canceled, as a result of subtracting the electric signal output from the green pixel G' from the electric signal output from the cyan pixel Cy, that is, the light detection unit capable of detecting a wavelength in the cyan spectrum range passing through CyF.

Figure 12:
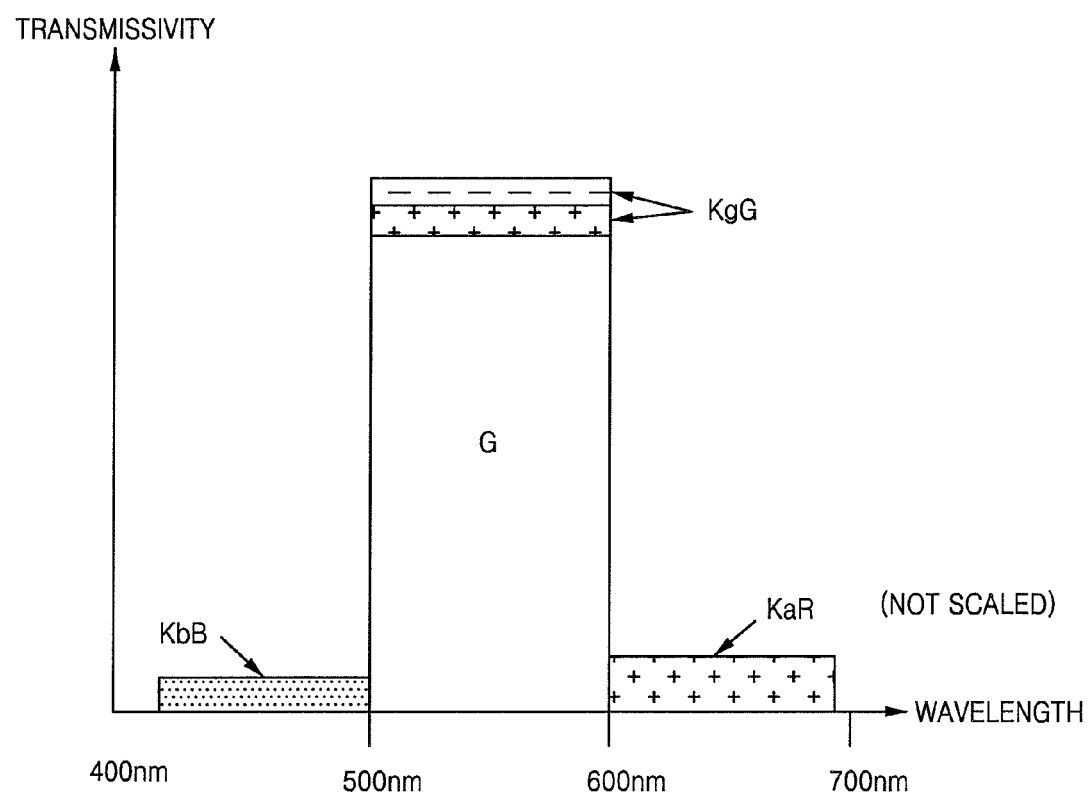
FIG. 12 is a graph for explaining the operation of a green signal operation unit of FIG. 9.

FIG. 12 is a graph for explaining the operation of the green signal operation unit 35 of FIG. 9. The green signal operation unit 35 outputs a green signal based on the electric signal output from the green pixel G'. In this case, crosstalk, for example, 4R"+4G"+4B, remains almost unchanged in the green signal. Each of "ka", "kb", and "kg" of FIG. 12 denotes a coefficient.

The image sensor including the color filter array that includes the white filter, the green filter, the yellow filter, and the cyan filter according to the present exemplary embodiment of the present invention may improve sensitivity by increasing light transmissivity. Also, the color filter array 20 according to the present exemplary embodiment of the present invention may not include the first white filter W1F and the second white filter W2F and may include only the green filter G', the yellow filter YeF and the cyan filter CyF. In this case, the incident light may be incident on each of the light detection units W1 and W2.

As described above, an image sensor according to exemplary embodiments of the present invention may improve transmissivity of an incident light using the complementary filter and the white filter, improve an SNR of the luminance signal, and improve sensitivity by canceling crosstalk.

Having described the exemplary embodiments of the present invention, it is further noted that it is readily apparent to those of reasonable skill in the art that various modifications may be made without departing from the spirit and scope of the invention which is defined by the metes and bounds of the appended claims.

What is claimed is:

1. An image sensor comprising:
a plurality of light detection units; and
a filter array including a plurality of filters, each of the plurality of filters being deposited on a corresponding one of the light detection units, wherein the filter array comprises:
a green filter used to transmit a green component of an incident light; a yellow filter used to transmit a yellow component of the incident light; a cyan filter used to transmit a cyan component of the incident light; at least four first white filters used to transmit the incident light; and at least four second white filters used to transmit the incident light,
wherein a first one of the at least four first white filters is located directly above the cyan filter and a second one of the at least four first white filters is located directly below the cyan filter, and wherein a first one of the at least four second white filters is located directly to the left of the cyan filter and a second one of the at least four second white filters is located directly to the right of the cyan filter in a same row.

2. The image sensor of claim 1, wherein the yellow filter and the cyan filter are located in a same row.

3. The image sensor of claim 1, wherein the yellow filter and the green filter are arranged in a first diagonal direction and the cyan filter and the green filter are arranged in a second diagonal direction.

4. The image sensor of claim 1, wherein the light detection units comprise:
a first light detection unit converting light passing through the green filter to a first electric signal;
a second light detection unit converting light passing through the yellow filter to a second electric signal; and
a third light detection unit converting light passing through the cyan filter to a third electric signal, and the image sensor further comprises:
a first operation circuit calculating a red signal by subtracting the first electric signal from the second electric signal; and
a second operation circuit calculating a blue signal by subtracting the first electric signal from the third electric signal.

5. The image sensor of claim 1, wherein the first one of the at least four first white filters and the first one of the at least four second white filters and the second one of the at least four second white filters are diagonally arranged, the first one of the at least four first white filters and the green filter are arranged in a same row, and the yellow filter, the cyan filter, and the first one of the at least four second white filters and the second one of the at least four second white filters are arranged in the same row.

6. The image sensor of claim 1, wherein the first one of the at least four second white filters is located directly above the green filter and a third one of the at least four second white filters is located directly below the green filter and wherein the second one of the at least four first white filters is located directly to the right of the green filter and a third one of the at least four first white filters is located directly to the left of the green filter in a same row.

7. An image sensor comprising:
a plurality of light detection units which includes a green detection unit having a green pixel, a yellow detection unit having a yellow pixel, a cyan detection unit having a cyan pixel, a first white detection unit having a first white pixel and a second white detection unit having a second white pixel;

a filter array including a plurality of filters, each of the plurality of filters being deposited on a corresponding one of the light detection units, wherein the filter array comprises:

a green filter used to transmit a green component of an incident light;

a yellow filter used to transmit a yellow component of the incident light;

a cyan filter used to transmit a cyan component of the incident light;

at least four first white filters used to transmit the incident light; and at least four second white filters used to transmit the incident light; and an operation unit, wherein the operation unit comprises a red signal operation unit which generates a red signal where cross-talk is canceled, a blue signal operation unit which generates a blue signal where cross-talk is canceled and a green signal operation unit which outputs a green signal from an electrical signal output from the green pixel, wherein a first one of the at least four second white filters is located directly above the green filter and a second one of the at least four second white filters is located directly below the green filter, and wherein a first one of the at least four first white filters is located directly to the left of the green filter and a second one of the at least four first white filters is located directly to the right of the green filter in a same row.

8. The image sensor of claim 7, wherein the red signal operation unit generates the red signal by subtracting an electrical output from the green pixel from an electrical output from the yellow pixel to generate the red signal where the cross-talk is canceled.

9. The image sensor of claim 8, wherein the blue signal operation unit generates the blue signal by subtracting an electrical output from the green pixel from an electrical output from the cyan pixel to generate the blue signal where the cross-talk is canceled.

10. The image sensor of claim 7, wherein a third one of the at least four first white filters is located directly above the cyan filter and the second one of the at least four first white filters is located directly below the cyan filter, and wherein the first one of the at least four second white filters is located directly to the left of the cyan filter and a third one of the at least four second white filters is located directly to the right of the cyan filter in a same row.

* * * * *